(12) United States Patent
Nishikawa et al.

(10) Patent No.: US 6,833,173 B1
(45) Date of Patent: Dec. 21, 2004

(54) FLOPPY DISK INCLUDING A SEED LAYER AND A PRIMER LAYER WITH SPECIFIED RELATIVE PROPERTIES

(75) Inventors: Masakazu Nishikawa, Odawara (JP); Makoto Nagao, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/670,616

(22) Filed: Sep. 27, 2000

(30) Foreign Application Priority Data

Sep. 27, 1999 (JP) .......................................... 11-272644

(51) Int. Cl.$^7$ ................................................ G11B 5/66
(52) U.S. Cl. ................... 428/65.3; 428/65.7; 428/213; 428/336; 428/337; 428/339; 428/473.5; 428/474.4; 428/694 TS; 428/694 SL
(58) Field of Search .............................. 428/65.3, 65.7, 428/213, 332, 334, 337, 339, 694 TS, 900, 473.5, 474.4, 694 SL, 336

(56) References Cited

U.S. PATENT DOCUMENTS

| | | | |
|---|---|---|---|
| 4,735,853 A | * | 4/1988 | Okudaira et al. ............ 428/336 |
| 5,139,849 A | * | 8/1992 | Takagi et al. ................ 428/143 |
| 5,277,977 A | * | 1/1994 | Tokuoka et al. ............. 148/105 |
| 5,702,794 A | * | 12/1997 | Hosoi et al. ................ 428/65.3 |
| 6,027,801 A | * | 2/2000 | Maro et al. .................. 428/332 |
| 6,071,607 A | * | 6/2000 | Okuyama et al. ............ 428/332 |
| 6,358,619 B1 | * | 3/2002 | Sueoka et al. ............... 428/474.4 |
| 6,368,722 B1 | * | 4/2002 | Mimura et al. .............. 428/474.4 |

FOREIGN PATENT DOCUMENTS

| | | | |
|---|---|---|---|
| JP | 10-021529 A | * | 1/1998 |
| WO | WO-99/20463 A1 | * | 4/1999 |

OTHER PUBLICATIONS

JPO Abstract Translation of JP 10–021529–A (Doc. ID: JP 10021529–A).*
Machine Translation of JP 10–21529–A.*
JPO Abstract Translation of WO 99/20463–A1 (Doc. ID: WO 9920463 A1).*
English Translation of JP 10–021529.*
English Translation of WO–99–020463.*

* cited by examiner

Primary Examiner—Kevin M. Bernatz
(74) Attorney, Agent, or Firm—Sughrue Mion, PLLC

(57) ABSTRACT

A magnetic recording medium, which comprises a flattening layer with a thickness of 0.1–5.0 μm, a seed layer, a nonmagnetic primer layer containing chromium with a chromium concentration of 77–100 atom %, a Co—Cr type alloy magnetic layer, a protective layer, and a lubricating layer coated sequentially on at least one of the surfaces of a flexible nonmagnetic support member, whereby the seed layer is designed in such a manner that the linear expansion coefficient ($E_{SE}$) of the seed layer and the linear expansion coefficient ($E_{UL}$) of the nonmagnetic primer layer satisfy the relation: $|E_{SE}-E_{UL}|/E_{UL}<0.3$, and the tensile strength ($S_{SE}$) of the seed layer and the tensile strength ($S_{UL}$) of the nonmagnetic primer layer satisfy the relation: $S_{SE}/S_{UL}>1$.

16 Claims, No Drawings

FLOPPY DISK INCLUDING A SEED LAYER AND A PRIMER LAYER WITH SPECIFIED RELATIVE PROPERTIES

BACKGROUND OF THE INVENTION

The present invention relates to a magnetic recording medium with high recording density, and in particular, to a removable type magnetic recording medium to be used in auxiliary memory unit, image storage unit, etc. of a computer. Further, the invention relates to a floppy disk using a flexible support member with high recording density of 1 GB or more per square inch.

With extreme increase in the capacity of electronic data prepared in devices such as personal computer, there are now strong demands on the development of a removable type disk comprising high capacity magnetic recording medium for the purpose of storing large amount of electronic data and for backup operation.

Up to now, digital video tape has been primarily used as ultra-high density recording medium for business use. With rapid increase in the amount of information in recent years, there are now demands on technical development to seek higher capacity and higher speed for recording and reproduction. Instead of the video tape currently used as main stream in this field, attempts are now being made to use removable type disk with better recording and reproducing speed as a digital recording medium for business use.

On the other hand, in the high density magnetic recording medium of GB class currently in use, a disk made of aluminum, glass, etc., i.e. the so-called hard disk, is used. When shock is applied on the device, head crash may occur, and both medium and head may be subjected to serious damage. This problem of shock-resistant property is not yet overcome in the removable type hard disk, and this has hindered the use as recording means in portable devices such as digital disk camera.

When the support member is changed from hard disk to a flexible member of the same type as a floppy disk, it is advantageous in that the recording unit can be produced in lightweight design, and damage at head crash can be alleviated. In this respect, there are now strong demands on the development of high density removable type magnetic recording medium using a flexible support member with high shock-resistant property as substrate.

In a removable type magnetic recording medium, a magnetic layer comprising a ferromagnetic metal or alloy is formed on a substrate. In particular, in the high density magnetic recording medium, for a ferromagnetic layer formed on the magnetic recording medium, a magnetic layer is formed by vacuum film forming method.

However, in the removable type magnetic recording medium using a flexible support member, there have been problems in that cracking occurs during manufacturing process and the product cannot be used as a medium.

It is an object of the present invention to provide a floppy disk type magnetic recording medium with high quality in a removable type high density magnetic recording medium using a flexible support member as substrate, and to prevent cracking in the manufacturing process.

SUMMARY OF THE INVENTION

The above problems can be solved by a floppy disk, which comprises a primer layer, a magnetic layer, a protective layer, and a lubricating layer coated on at least one of the surfaces of a flexible nonmagnetic support member, whereby a seed layer is provided between the flexible support member and the primer layer.

Also, the present invention provides a floppy disk as described above, wherein there is provided a flattening layer, comprising a heat-resistant polymer on the flexible nonmagnetic support member.

Further, the present invention provides a floppy disk as described above, wherein the thickness of the flexible support member is within the range of 30–100 $\mu$m.

Also, the present invention provides a floppy disk as described above, wherein a Co—Cr alloy with a Cr concentration within the range of 10–30 atom % is used for the magnetic layer.

Further, the present invention provides a floppy disk as described above, wherein a Cr alloy with a Cr concentration within the range of 77–100 atom % is used as the primer layer.

Also, the present invention provides a floppy disk, which comprises a flattening layer with a thickness of 0.1–5 $\mu$m, a seed layer, a nonmagnetic primer layer containing a Cr alloy with a Cr concentration of 77–100 atom %, a magnetic layer containing a Co—Cr alloy with a Cr concentration of 10–30 atom %, a protective layer, and a lubricating layer, all of said layers being coated on at least one of the surfaces of a flexible support member with a thickness of 30–100 $\mu$m, whereby the thickness of the seed layer is 5–100 nm, and the linear expansion coefficient ($E_{SE}$) of the seed layer and the linear expansion coefficient ($E_{UL}$) of the nonmagnetic primer layer satisfy the relation: $|E_{SE}-E_{UL}|/E_{UL}<0.3$, and the tensile strength ($S_{SE}$) of the seed layer and the tensile strength ($S_{UL}$) of the nonmagnetic primer layer satisfy the relation: $S_{SE}/S_{UL}>1$.

DESCRIPTION OF THE PREFERRED EMBODIMENT

The present inventors have found that it is possible to provide a floppy disk with stable performance characteristics. Specifically, on at least one of the surfaces of a flexible nonmagnetic support member, a primer layer, a magnetic layer, a protective layer, and a lubricating layer are coated to obtain a floppy disk. By providing a seed layer between the flexible support member and the primer layer, it is possible to prevent cracking in the manufacturing process and to obtain a floppy disk with stable performance characteristics.

Further, a specific type of flattening layer, a primer layer and a magnetic layer are formed on the nonmagnetic support member. Also, the following material is used as seed layer, i.e. linear expansion coefficient ($E_{SE}$) of the metal seed layer and linear expansion coefficient ($E_{UL}$) of the nonmagnetic primer layer satisfy the relation: $|E_{SE}-E_{UL}|/E_{UL}<0.3$, and tensile strength ($S_{SE}$) of the metal seed layer and tensile strength ($S_{UL}$) of the nonmagnetic primer layer satisfy the relation: $S_{SE}/S_{UL}>1$. As a result, it was found that cracking can be prevented when the medium is prepared.

Specifically, cracking often occurs on the ferromagnetic metal thin film formed on a substrate using a flexible material as the nonmagnetic support member. It was found that this is caused by flatness which is required on a magnetic recording medium with high recording density and also by thermal expansion of the seed layer, the primer layer, etc. formed on the magnetic recording medium.

When a hard disk made of aluminum, glass, etc. is used as a support member, it is possible to attain flatness closer to mirror surface by polishing. In case of a floppy disk, however, a flexible support member is used as the support member, and it is very difficult to improve the flatness by polishing. In this respect, by providing a polymeric flattening layer on the flexible support member, surface properties similar to a hard disk support member can be attained. On the flattening layer, a nonmagnetic primer layer and a magnetic layer are formed by sputtering. In order to increase the magnetostatic property and electromagnetic transfer characteristics of the magnetic layer, it is necessary to heat the support member at a high temperature of 100° C.–300° C. Alternatively, the temperature of the support member is effectively increased when bias voltage application, RF sputtering method, etc. are used.

The medium with the nonmagnetic primer layer and the magnetic layer formed on it is cooled down to room temperature and is taken out of a sputtering device. During the manufacturing process with varying temperature, the flexible support member, the flattening layer, the nonmagnetic primer layer, and the magnetic layer are subject to thermal expansion and shrinking.

In a hard disk, the support member is made of a hard material, and metal, ceramics, glass, etc. are typically used as the material. In this respect, the difference of expansion coefficient is small between the primer layer and the support member, and there is less possibility that cracking occurs during heating and cooling processes due to the difference in thermal expansion. In a magnetic recording medium using a flexible support member as the substrate, the flexible support member and the flattening layer are made of macromolecular compositions, and the nonmagnetic primer layer and the magnetic layer are made of a metal material. For this reason, thermal expansion or shrinking differs between these two layers by about one digit. The material of the nonmagnetic primer layer cannot endure the deformation of the support member when cooled do, and this may result in cracking on the magnetic recording medium.

When a nonmagnetic primer layer, i.e. a seed layer, is provided between the flattening layer and the primer layer, a force generated between the flattening layer and the primer layer which occurs when the support member is cooled down is received by the primer layer and the seed layer. As a result, film strength is improved, and cracking can be prevented.

It is proposed to use the following material as the material of the seed layer and the primer layer, i.e. a material, in which the linear expansion coefficient ($E_{SE}$) of the metal seed layer and the linear expansion coefficient ($E_{UL}$) of the nonmagnetic primer layer satisfy the relation: $|E_{SE}-E_{UL}|/E_{UL}<0.3$, and the tensile strength ($S_{SE}$) of the metal seed layer and the tensile strength ($S_{UL}$) of the nonmagnetic primer layer satisfy the relation: $S_{SE}/S_{UL}>1$. In this manner, it is possible to cope with the force, which is generated due to the difference of the linear expansion coefficients between the primer layer and the magnetic layer in the cooling process, and cracking can be prevented on a higher level.

Specifically, the invention provides a floppy disk with ultra-high recording density, which comprises at least a primer layer, a magnetic layer, a protective layer, and a lubricating layer on a flexible support member, and by which it is possible to prevent cracking during the preparation of the medium.

For the purpose of preventing cracking during the above process, such materials are used that the linear expansion coefficient ($E_{SE}$) of the metal seed layer and the linear expansion coefficient ($E_{UL}$) of the nonmagnetic primer layer satisfy the relation: $|E_{SE}-E_{UL}|/E_{UL}<0.3$, and the tensile strength ($S_{SE}$) of the metal seed layer and the tensile strength ($S_{UL}$) of the nonmagnetic primer layer satisfy the relation: $S_{SE}/S_{UL}>1$. As a result, it is possible to prevent cracking during the preparation of the medium and to provide a floppy disk with high recording density.

The following description relates to the materials which are preferably used in the present invention.

As the support member of the magnetic recording medium of the present invention, polyethylene terephthalate, polyethylene naphthalate, polymide, polyamide, polyamideimide, polybenzoxazole, etc. may be used. The Young's modulus of the support member of the magnetic recording medium of the present invention is preferably 200–1600 kg/mm$^2$, or more preferably 300–800 kg/mm$^2$. The thickness of the support member is preferably 20–150 μm, or more preferably 30–80 μm.

To improve the flatness of the surface of the support member, a flattening layer is provided on the support member. For the flattening layer, a heat-resistant polymer may be extensively used. More preferably, a material such as a silicone resin, a polyamide resin, a polyamideimide resin, a polyimide resin, etc. may be used. These materials have high heat-resistant properties and exhibit excellent performance in surface properties magnetostatic properties. Coating thickness of the flattening layer is preferably 0.1–5.0 μm, or more preferably 0.5–3.0 μm, or most preferably 0.8–2.0 μm.

Micro-size projections, e.g. fine particles of inorganic substances such as $SiO_2$, $Al_2O_3$, $TiO_2$, etc. or fine particles of organic substances, may be provided on the surface of the flattening layer. Particle size of the fine particles to be used for the formation of micro-size projections is preferably 5–40 nm, or more preferably 10–35 nm, or most preferably 15–30 nm. The height of the projection to be formed on the surface of the flattening layer is preferably 30 nm or less.

When particle size of the fine particles to be formed on the surface of the flattening layer is less than 5 nm, the effect of the presence of fine particles on the surface of the flattening layer cannot be attained. If it is more than 40 nm, surface irregularities may occur on the layer subsequently formed, and this may lead to lower flatness.

The seed layer to be formed between the flattening layer and the primer layer, preferably contains at least one type of metal of Ta, Mo, W, V, Zr, Cr, Rh, Hf, Nb, Mn, Ni, Al, Ru, Ti and Si, or an alloy containing two types or more of these elements. Also, the material may contain oxygen, nitrogen, etc.

The thickness of the seed layer is preferably 10–100 nm, or more preferably 15–80 nm, or most preferably 20–60 nm. If the seed layer is thinner than 10 nm, the structure of the seed layer may become discontinuous. A force generated due to thermal shrinking may be applied on the primer layer, and cracking may occur. If it is thicker than 100 nm, cracking and film detachment may occur on the magnetic recording medium due to film stress on the seed layer. The seed layer can be produced by DC sputtering under argon atmosphere. The temperature suitable for producing the seed layer is 5° C.–250° C., or more preferably 10° C.–200° C.

As the material for the nonmagnetic primer layer, it is preferable to use chromium or an alloy containing chromium and at least one type of metals of Ti, W, Mo, V, Ta, B, Si, Nb, Zr, Al and Mn. Cr concentration of the nonmagnetic primer layer is 77–100 atom %, or more preferably 80–95 atom %, and the remainder is metals of the other elements.

The thickness of the nonmagnetic primer layer is preferably 5–500 nm, or more preferably 10–100 nm. If the primer layer is thicker than 500 nm, particle size of the magnetic layer is increased, and this leads to the increase of medium noise.

It is necessary to design in such manner that linear expansion coefficient ($E_{SE}$) of the metal seed layer and linear expansion coefficient ($E_{UL}$) of the nonmagnetic primer layer satisfy the relation: $|E_{SE}-E_{UL}|E_{UL}<0.3$, and tensile strength ($S_{SE}$) of the seed layer and tensile strength ($S_{UL}$) of the nonmagnetic primer layer satisfy the relation: $S_{SE}/S_{UL}>1$. More preferably, the following relations must be satisfied:

$$|E_{SE}-E_{UL}|E_{UL}<0.2$$

and $$S_{SE}/S_{UL}>1.1$$

As the material for the medium to satisfy the above relations, Ta (film thickness: 20 nm; input power: 11.4 W/cm$^2$; argon partial pressure: 8 mTorr) may be used as the material for the seed layer, and CrTi$_{20}$ (film thickness: 60 nm; input power 11.4 W/cm$^2$; argon partial pressure: 15 mTorr) may be used as the material for the nonmagnetic primer layer.

As the magnetic material to form the magnetic layer, cobalt-chromium alloy may be preferably used. In particular, it is preferable to use cobalt-chromium alloy containing Pt, Ta, Ni, Si, B, Ni, or Pd. Also, oxygen may be contained.

Among these materials, it is more preferable to use Co—Cr—Pt or Co—Cr—Pt—Ta because these have superb property in both output and noise characteristics. In addition to cobalt-chromium alloy, barium ferrite may be used. Cr concentration in the ferromagnetic layer is preferably 10–30 atom %, or more preferably 12–28 atom %, or most preferably 15–25 atom %. Film thickness of the magnetic layer is preferably 10–300 nm, or more preferably 10–60 nm.

It is preferable that the nonmagnetic primer layer and the magnetic layer are formed by vacuum film forming method. In particular, it is preferable to use the sputtering method because film can be formed without changing composition of the elements. Also, it is preferable to continuously form the film under vacuum condition for all of the seed layer, the primer layer and the magnetic layer.

It is preferable to provide a carbon film comprising amorphous carbon, graphite, diamond structure or mixture of these materials prepared by plasma CVD method, sputtering method, etc. on the magnetic layer as a protective layer. In particular, it is preferable to use hard amorphous carbon film, generally called diamond-like carbon. This hard carbon film is preferably 1000 kg/mm$^2$ or more in Vickers hardness, or more preferably 2000 kg/mm$^2$.

The film thickness of the protective layer is preferably 2.5–30 nm, or more preferably 5–25 nm.

In the magnetic recording medium of the present invention, with the purpose of improving running durability and corrosion-resistant property, it is preferable to add lubricant or rust-preventive agent on the magnetic layer or the protective layer.

As the lubricant, hydrocarbon type lubricant, fluorine type lubricant, extreme-pressure additive, etc. already known in the art may be used. As the hydrocarbon type lubricant, carboxylic acids such as stearic acid, oleic acid, etc., esters such as butyl stearate, sulfonic acids such as octadecyl sulfonic acid, phosphoric acid esters such as monooctadecyl phosphate, alcohols such as stearyl alcohol, oleyl alcohol, etc., carboxylic acid amide such as stearic acid amide, etc., amines such as stearyl amine may be used.

As the fluorine type lubricant, a lubricant prepared by substituting a part or all of the alkyl groups in the hydrocarbon type lubricant by fluoroalkyl group or perfluoropolyether group may be used. As the perfluoropolyether group, perfluoromethylene oxide polymer, perfluoroethylene oxide polymer, perfluoro-n-propylene oxide polymer $(CF_2CF_2CF_2O)_n$, perfluoroisopropylene oxide polymer (CF $(CF_3)CF_2O)_n$ or copolymer of these compounds may be used.

As the extreme-pressure additive, phosphoric acid esters such as trilauryl phosphate, phosphorous acid esters such as trilauryl phosphite, thiophosphorous acid esters such as trilauryl trithiophosphite, sulfur type extreme-pressure agent such as dibenzyl disulfide may be used.

The lubricants as described above may be used alone or in combination. To apply these lubricants on the protective layer, the lubricant is dissolved in an organic solvent, and it is coated by wire bar method, gravure method, spin coat method, dip coat method, etc., or it may be attached by vacuum evaporation method.

The coating quantity of the lubricant is preferably 1–30 mg/m$^2$, or more preferably, 2–20 mg/m$^2$.

As the rust-preventive agent to be used in the present invention, nitrogen-containing heterocyclic compounds such as benzotriazole, benzimidazole, purine, pyrimidine, etc., derivatives prepared by introducing alkyl side-chain to or the base nucleus, nitrogen- or sulfur-containing heterocyclic compounds and derivatives such as benzothiazole, 2-mercaptobenzothiazole, tetrazaindene cyclic compound, thiouracil compound may be used

[Embodiments]

In the following, description will be given on concrete examples of the present invention:

EXAMPLE 1

On a polyimide flexible support member of 75 μm in thickness, polyimide resin of 1 μm in thickness was provided as a flattening layer. Tantalum was coated on it in thickness of 20 nm as a seed layer by DC sputtering methodunder the conditions of argon partial pressure of 8 mTorr, input power of 11.4 W/cm$^2$, and support member temperature of 20° C. Further, as the nonmagnetic primer layer, chromium alloy containing titanium by 20 atom % was coated in thickness of 60 nm by DC sputtering method under the conditions of argon partial pressure of 15 mTorr, input power of 11.4 W/cm$^2$, and support member temperature of 200° C.

Next, as the magnetic layer, a Co alloy thin film containing Cr by 20 atom % and Pt by 12 atom % was formed by DC sputtering method on the nonmagnetic primer layer under the conditions of argon partial pressure of 1.5 mTorr, input power of 11.4 W/cm$^2$, support member temperature of 200° C., and film thickness of 30 nm.

Next, on the magnetic layer, a carbon protective layer of 20 nm in thickness was formed by DC sputtering method under the conditions of argon partial pressure of 3 mTorr, and input power of 5.71 W/cm$^2$.

Further, monolauryl phosphate $(CH_3(CH_2)_{11}OPO_3H_2)$ and amine stearate $(CH_3(CH_2)_{17}NH_2)$ were dissolved in methanol, and this solution was coated as lubricant by wire bar method in such manner that molar ratio of organic acid and amine will be 1:1 and coating amount of these two substances will be 6 mg/m$^2$, and a floppy disk was prepared.

EXAMPLES 2 TO 6

A floppy disk was prepared for each of Examples 2 to 12 by the same procedure as in Example 1 except that the material for the seed layer or the material for the nonmagnetic primer layer in Example 1 was changed to the material shown in Table 1.

Comparative Example 1

A floppy disk of Comparative example 1 was prepared by the same procedure as in Example 1 except that the seed layer was not provided.

Comparative Examples 2 to 11

A floppy disk for each of Comparative examples 2 to 11 was prepared by the same procedure as in Example 1 except that the material for the seed layer in Example 1 was changed to the material shown in Table 1.

Each magnetic recording medium in the Examples and Comparative examples as described above was measured by the measuring methods given below. The results of the measurement are shown in Table 1.

(Measuring Methods)
(1) Linear Expansion Coefficient

For the measurement of linear expansion coefficient, a sputtering device (S-50S; Shibaura Engineering Works Co., Ltd.) was used. The specimen was heated to 300° C. using a lamp heater under vacuum condition of $10^{-6}$ Torr or lower. The amount of deformation of the specimen was obtained using a strain gauge (strain gauge WK; Micromeasurement Inc.) mounted on both surfaces of the specimen.

A specimen of 5 mm×30 mm with a single layer formed on each of both surfaces of a polyimide support member was used. To exclude the influence of deformation of the support member, the strain gauge was also mounted on the support member using polyimide only, and the amount of deformation was measured on each of the specimens.

The amount of deformation (Vsp) of the specimen with the film formed on it and the amount of deformation (Vpi) of the support member using polyimide only were measured. A difference of the amount of deformation between these two, i.e. (Vsp−Vpi), was defined as the amount of deformation of the formed film. Linear expansion coefficient was obtained by the following equation:

$$\text{Linear expansion coefficient} = (Vsp - Vpi)/\text{length of specimen}/\text{temperature difference}$$

(2) Tensile Strength

Under the conditions given in Examples and Comparative examples, a single layer was formed on each of both surfaces of the polyimide support rasher. This specimen in size of 5 mm×30 mm was pulled using a tensile tester (Tensilon STM-T-50BP; Tokyo Boring Co., Ltd.). The surface of the formed film was examined under microscope with magnifying factor of 200×, and a value of load, under which cracking occurred, was defined at tensile strength.

(3) Cracking

A protective layer was formed by sputtering method. After cooling down, the surface of the specimen was examined under differential interference type microscope (XP(U) NR-A; Nikon Corporation). The specimen was examined at 30 points at random with magnifying factor of 200×. When no cracking was found during 30 measurements, it was defined as "very good". If cracks were found at 2 points or less, it was defined as "good". If cracks were found at more than 2 points, it was regarded as "no good".

TABLE 1

| | Primer layer | $E_{UL}$ | $S_{UL}$ | Seed layer | $E_{SE}$ | $S_{SE}$ | Expansion ratio | Strength ratio | Cracks |
|---|---|---|---|---|---|---|---|---|---|
| Example 1 | $CrTi_{20}$ | 6.9 | 38.4 | Ta | 6.5 | 53.0 | 0.13 | 1.38 | Very good |
| Example 2 | $CrTi_{20}$ | 6.9 | 38.4 | Mo | 5.1 | 49.0 | 0.26 | 1.28 | Very good |
| Example 3 | $CrTi_{20}$ | 6.9 | 38.4 | Rh | 8.5 | 54.9 | 0.23 | 1.43 | Very good |
| Example 4 | $CrMo_{20}$ | 6.2 | 43.0 | Ta | 6.5 | 53.0 | 0.04 | 1.23 | Very good |
| Example 5 | $CrMo_{20}$ | 6.2 | 43.0 | Mo | 5.1 | 49.0 | 0.18 | 1.13 | Very good |
| Example 6 | $CrTi_{20}$ | 6.9 | 38.4 | $CrTi_{25}$ | 6.3 | 39.2 | 0.09 | 1.00 | Good |
| Example 7 | $CrTi_{20}$ | 6.9 | 38.4 | Zr | 5.0 | 35.0 | 0.27 | 0.91 | Good |
| Example 8 | $CrTi_{20}$ | 6.9 | 39.4 | Nb | 7.2 | 21.0 | 0.04 | 0.73 | Good |
| Example 9 | $CrTi_{20}$ | 6.9 | 38.4 | Ir | 6.8 | 20.3 | 0.01 | 0.53 | Good |
| Example 10 | $CrTi_{20}$ | 6.9 | 38.4 | Mn | 23.0 | 50.4 | 2.33 | 1.31 | Good |
| Example 11 | $CrTi_{20}$ | 6.9 | 38.4 | Al | 23.5 | 4.76 | 2.41 | 0.13 | Good |
| Example 12 | $CrMo_{20}$ | 6.2 | 43.0 | Rh | 8.5 | 54.9 | 0.37 | 1.27 | Good |
| Comparative example 1 | $CrTi_{20}$ | 6.9 | 38.4 | — | — | — | — | — | No good |
| Comparative example 2 | $CrMO_{20}$ | 5.8 | 43.0 | — | — | — | — | — | No good |
| Comparative example 3 | Cr | 6.2 | 42.0 | — | — | — | — | — | No good |
| Comparative example 4 | Rh | 8.5 | 54.9 | — | — | — | — | — | No good |
| Comparative example 5 | Zr | 5.0 | 35.0 | — | — | — | — | — | No good |
| Comparative example 6 | Ta | 6.5 | 53.0 | — | — | — | — | — | No good |
| Comparative example 7 | Mo | 5.1 | 49.0 | — | — | — | — | — | No good |
| Comparative example 8 | Mn | 23.0 | 50.4 | — | — | — | — | — | No good |
| Comparative example 9 | Al | 23.5 | 4.76 | — | — | — | — | — | No good |
| Comparative example 10 | Mo | 5.1 | 49.0 | — | — | — | — | — | No good |

TABLE 1-continued

|  | Primer layer | $E_{UL}$ | $S_{UL}$ | Seed layer | $E_{SE}$ | $S_{SE}$ | Expansion ratio | Strength ratio | Cracks |
|---|---|---|---|---|---|---|---|---|---|
| Comparative example 11 | $CrTi_{20}$ | 6.3 | 39.2 | — | — | — | — | — | No good |

In Table 1,
$E_{UL}$: Linear expansion coefficient of the primer layer (unit: $10^{-6}$)
$S_{UL}$: Tensile strength of the primer layer (unit: $kg/mm^2$)
$E_{SE}$: Linear expansion coefficient of the seed layer (unit: $10^{-6}$)
$S_{SE}$: Tensile strength of the seed layer (unit: $kg/mm^2$)
Expansion ratio: $|E_{SE} - E_{UL}|/E_{UL}$
Strength ratio: $S_{SE}/S_{UL}$ As described above, a flattening layer is formed on a flexible support member, and a seed layer is provided between the above layer and a nonmagnetic primer layer which is formed as a primer layer of the magnetic layer, and the linear expansion coefficient and the tensile strength of the seed layer and the nonmagnetic primer layer were set to specific values. As a result, film strength is increased, and it is possible to prevent cracking due to thermal expansion which occurs when the magnetic recording medium is exposed to a temperature increase or decrease during the manufacturing process, and the magnetic recording medium for high density recording can be manufactured in a stable manner.

What is claimed is:

1. A floppy disk comprising a base material and, sequentially formed on both surfaces of said base material, a metal seed layer, a primer layer, a magnetic layer, a protective layer, and a lubricant layer, wherein said base material comprises a nonmagnetic flexible support member with a thickness in the range of 30–150 μm and formed on both surfaces of said nonmagnetic flexible support member a heat-resistant macromolecular flattening layer, wherein said heat-resistant macromolecular flattening layer comprises at least one type of silicone resin, polyimide resin, polyamideimide resin or polyamide resin, wherein the linear expansion coefficient of the seed layer ($E_{SE}$) and the linear expansion coefficient of the primer layer ($E_{UL}$) satisfy a relation of: $|E_{SE}-E_{UL}|/E_{UL}<0.3$, and the tensile strength of the seed layer ($S_{SE}$) and the tensile strength of the primer layer ($S_{UL}$) satisfy a relation of: $S_{SE}/S_{UL}>1$, wherein the seed layer contains at least one metal selected from the group consisting of Ta, Mo, W, V, Zr, Cr, Rh, Hf, Nb, Mn, Ni, Al, and Ru, or an alloy of these elements.

2. A floppy disk according to claim 1, wherein the thickness of the flexible support member is within the range of 30–100 μm.

3. A floppy disk according to claim 1, wherein the thickness of the seed layer is in the range of 20–60 nm.

4. A floppy disk according to claim 1, wherein the thickness of the flattening layer is within the range of 0.1–5.0 μm.

5. A floppy disk according to claim 4, wherein microprojections comprising fillers are formed on said flattening layer and between said flattening layer and said seed layer.

6. A floppy disk according to claim 5, wherein said fillers comprise inorganic oxides and have particle size within the range of 5–40 nm.

7. A floppy disk according to claim 6, wherein temperature of the support member during the formation of the metal layer is within the range of 10–200° C.

8. A floppy disk according to claim 7, wherein the magnetic layer comprises a CoCr alloy as main component.

9. A floppy disk according to claim 8, wherein the Cr concentration in the magnetic layer is within the range of 10–30 atom %.

10. A floppy disk according to claim 9, wherein the primer layer comprises Cr or a nonmagnetic alloy containing Cr as main component, and the Cr content of the primer layer is within the range of 77–100 atom %.

11. A floppy disk according to claim 1, wherein microprojections comprising fillers are formed on said flattening layer and between said flattening layer and said seed layer.

12. A floppy disk according to claim 11, wherein said fillers comprise inorganic oxides and have particle size within the range of 5–40 nm.

13. A floppy disk according to claim 12, wherein temperature of the support member during the formation of the metal layer is within the range of 10–200° C.

14. A floppy disk according to claim 13, wherein the magnetic layer comprises a CoCr alloy as main component.

15. A floppy disk according to claim 14, wherein the Cr concentration in the magnetic layer is within the range of 10–30 atom %.

16. A floppy disk according to claim 15, wherein the primer layer comprises Cr or a magnetic alloy containing Cr as main component, and the Cr content of the primer layer is within the range of 77–100 atom %.

* * * * *